July 21, 1964     R. C. NELSON     3,141,229

TOOLHOLDER

Filed July 24, 1961

INVENTOR.
ROBERT C. NELSON

BY *Lindsey Prutzman and Hayes*

ATTORNEYS

United States Patent Office 3,141,229
Patented July 21, 1964

3,141,229
TOOL HOLDER
Robert C. Nelson, Southington, Conn., assignor to Accurate Screw Products, Incorporated, Southington, Conn., a corporation of Connecticut
Filed July 24, 1961, Ser. No. 126,110
3 Claims. (Cl. 29—98)

This invention relates to toolholders having particular utility for supporting skiving tools and the like.

It is a principal object of this invention to provide a new and improved toolholder that is adjustable without the use of shims or similar devices for independently varying the depth of cut of a skiving tool or other cutting tool and the angular relation of the cutting edge of the tool with respect to the workpiece and which accurately maintains these adjustments even though the tool be removed from the holder for replacement or sharpening.

It is another object of this invention to provide an improved toolholder which can firmly but adjustably support cutting tools of varying dimensions and which can accurately retain these tools without requiring frequent readjustment thereof.

It is a further object of this invention to provide an improved toolholder which is of economical and durable construction and which may be readily adjusted for providing the appropriate alignment between the tool and workpiece.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
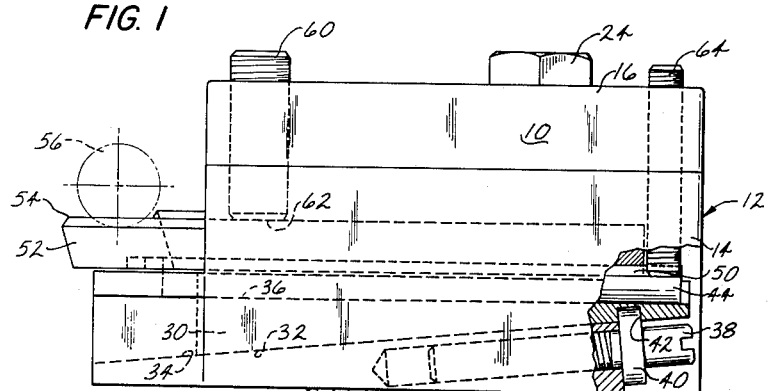
FIG. 1 is a side view partly broken away and partly in section of a toolholder of this invention shown supporting a skiving tool and mounted upon a machine tool cross slide.
Figure 2:
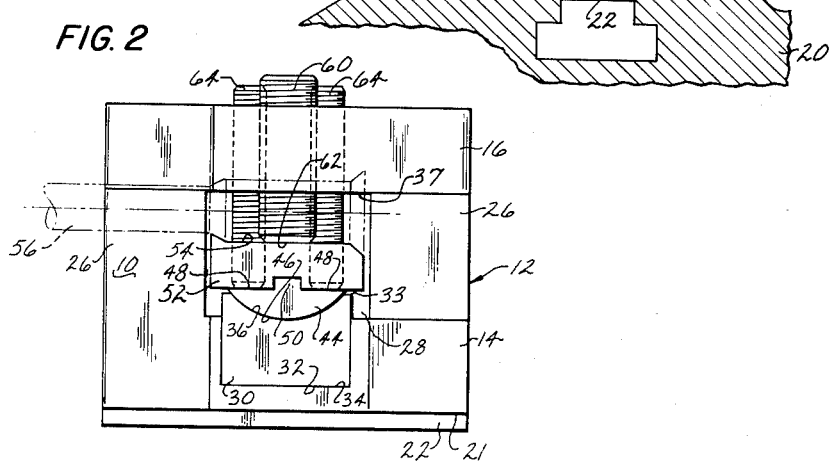
FIG. 2 is a front end view of the toolholder and skiving tool of FIG. 1.
Figure 3:
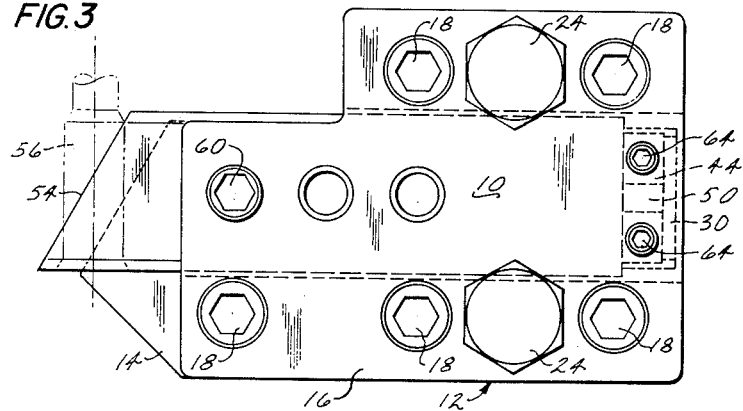
FIG. 3 is a top view of the toolholder and skiving tool of FIG. 1.

Referring now to the drawings in detail, a toolholder embodying the present invention, generally designated by the numeral 10, comprises an elongated holder body 12 which includes a U-shaped or slotted base 14 and a cap 16 rigidly secured thereto as by the cap screws 18. For retaining the toolholder upon a machine cross slide 20 (FIG. 1), there is provided on the base 14 a support surface 21 that is parallel to the longitudinal axis of the holder body, a flange 22 and a pair of bolts 24 that extend through the cap and base for threaded engagement with the cross slide. The legs 26 of the base 14 define an elongated tool receiving opening 28 adjacent to which there is provided an elongated wedge or tool support member 30 having a lower surface 32 inclined relative to its upper edge 33 and slidably engaging a similarly inclined surface 34 on the base 14. For adjusting the wedge member 30 longitudinally within the opening 28 along the surface 34 there is provided an adjustment screw 38 that is threaded within the base 14 adjacent the wedge member 30 with its axis parallel to the inclined surfaces 32 and 34 and which has a fixed collar 40 that is received within a slot or recess 42 in the wedge member. Opposite the surface 32 there is formed on the wedge member 30 a concave cylindrical surface portion 36, and inasmuch as the axis of this concave cylindrical surface portion extends at an angle with respect to the surfaces 32 and 34 and substantially parallel to the upper edge 33 and parallel to the longitudinal axis of the tool body, it remains parallel to the surface 37 of the cap 16 as the wedge member 30 is moved in opposite longitudinal directions on the base 14.

Mounted for sliding movement upon the wedge member 30 is a rocker member 44 which has formed on one side thereof a convex cylindrical surface portion 46 that conforms to and is in engagement with the concave surface portion 36 so as to allow the rocker member to slide upon the wedge member about the common axis of the cylindrical surface portions 36 and 46. A pair of discontinuous plane surface portions 48 are formed on the upper surface of rocker 44 and extend parallel to the axis of the cylindrical surface portions to provide mounting surfaces for a cutting tool 52 that is illustrated as a skiving tool having an upper cutting edge 54 which can be used in the well-known manner for forming the external surface on a rotating workpiece 56 shown in phantom in the drawing. The cutting tool 52 is retained upon the rocker member 44 against movement laterally of the axis of the cylindrical surface portions 36 and 46 by an elongated upstanding key formed integral with the rocker between the discontinuous surface portions 48.

For clamping the cutting tool 52 on the rocker member 44, there is provided a set screw 60 threaded within the cap 16 preferably adjacent the forward end thereof with its inner end 62 engaging the cutting tool approximately at the axis of the cylindrical surface portions 36 and 46 so as to avoid creating a moment tending to pivot the rocker member 44 on the wedge member 30. For angularly adjusting the rocker member 44 and for retaining the rocker member in its selected angular position, there are provided a pair of set screws 64, preferably located adjacent the rear end of the tool support which have their inner ends in engagement with the surface portions 48 adjacent the lateral edges thereof.

The cutting tool 52 in the toolholder can be readily adjusted for varying the height of the tool within the toolholder by adjusting the screw 38 as by a screw driver, and the angular position of the cutting tool 52 can be adjusted with the set screws 64. Inasmuch as these adjustments are entirely independent of each other and independent of the means 60 for retaining the cutting tool within the toolholder, the cutting tool can be readily removed for replacement or for sharpening or the like without affecting the previously set adjustments. Additionally, the key 50 retains the cutting tool in a lateral position that is substantially unaffected by the height and angular adjustments of the tool.

As will be apparent to persons skilled in the art, various modifications and adaptations of the structure above described will become readily apparent without departure from the spirit and scope of the invention, the scope of which is defined in the appended claims.

I claim:

1. A holder for an elongated cutting tool with a cutting edge at one longitudinal end thereof comprising a holder body having a longitudinally extending wedge supporting surface, a wedge member longitudinally slideable on said wedge supporting surface having a concave cylindrical surface portion with a longitudinally extending axis inclined to said wedge supporting surface, a rocker member having a convex cylindrical surface portion conforming to and in slideable engagement with said concave surface portion and a longitudinal tool supporting surface extending substantially parallel to said axis, means for retaining the tool on the tool supporting surface with the longitudinal axis of the tool substantially parallel to the axis of the cylindrical surface, means for angularly adjusting the rocker member on the concave cylindrical surface for angularly adjusting the tool about its longitudinal axis, and means for longitudinally adjusting the wedge member on the wedge supporting surface of the holder body for adjusting the tool in a direction substantially normal to its longitudinal axis.

2. The holder of claim 1 wherein the means for angularly adjusting the rocker member comprises a pair of adjustment screws threadedly mounted in the holder body having their inner ends engageable with the rocker member.

3. The holder of claim 1 wherein the means for retaining the tool on the tool supporting surface comprises means for operatively keying the tool to the tool supporting surface for longitudinal adjustment of the tool on the tool supporting surface and retention of the tool against lateral movement thereon.

References Cited in the file of this patent

UNITED STATES PATENTS

| 67,630 | Burdge | Aug. 18, 1867 |
| 102,278 | Knox | Apr. 26, 1870 |
| 373,878 | Bogert | Nov. 29, 1887 |
| 751,701 | Tiffany | Feb. 9, 1904 |
| 1,083,230 | Taylor | Dec. 30, 1913 |

FOREIGN PATENTS

| 425,997 | Great Britain | Mar. 26, 1935 |